United States Patent [19]

Nelson

[11] 4,001,821
[45] Jan. 4, 1977

[54] HIGH POWER MICROWAVE RADAR PULSE SHAPING SYSTEM

[75] Inventor: Theodore M. Nelson, Ellicott City, Md.

[73] Assignee: The United States of America as represented by the Secretary of the Air Force, Washington, D.C.

[22] Filed: June 16, 1975

[21] Appl. No.: 587,490

[52] U.S. Cl. .............................. 343/5 R; 333/10; 333/20
[51] Int. Cl.² ................. G01S 9/02; H01P 5/18; H04B 3/04
[58] Field of Search ...... 343/5 R; 333/98 S, 99 PL, 333/10, 20

[56] References Cited

UNITED STATES PATENTS

| 3,603,991 | 9/1971 | Bernstein et al. ............... 343/5 R |
| 3,745,567 | 7/1973 | Quinn et al. ............... 333/99 PL X |
| 3,845,427 | 10/1974 | Schubert ...................... 333/98 S |
| 3,903,489 | 9/1975 | Schubert ...................... 333/98 S |

Primary Examiner—Malcolm F. Hubler
Attorney, Agent, or Firm—Joseph E. Rusz; George Fine

[57] ABSTRACT

A high power microwave radar pulse shaping system includes a hybrid and a pair of plasma waveguide switches in combination. The two plasma waveguide switches with the hybrid between them, which, by grid pulsing of the plasma waveguide switches electronically change the RF pulsewidth and form extremely sharp leading and falling edges of the RF pulse passing therethrough.

2 Claims, 1 Drawing Figure

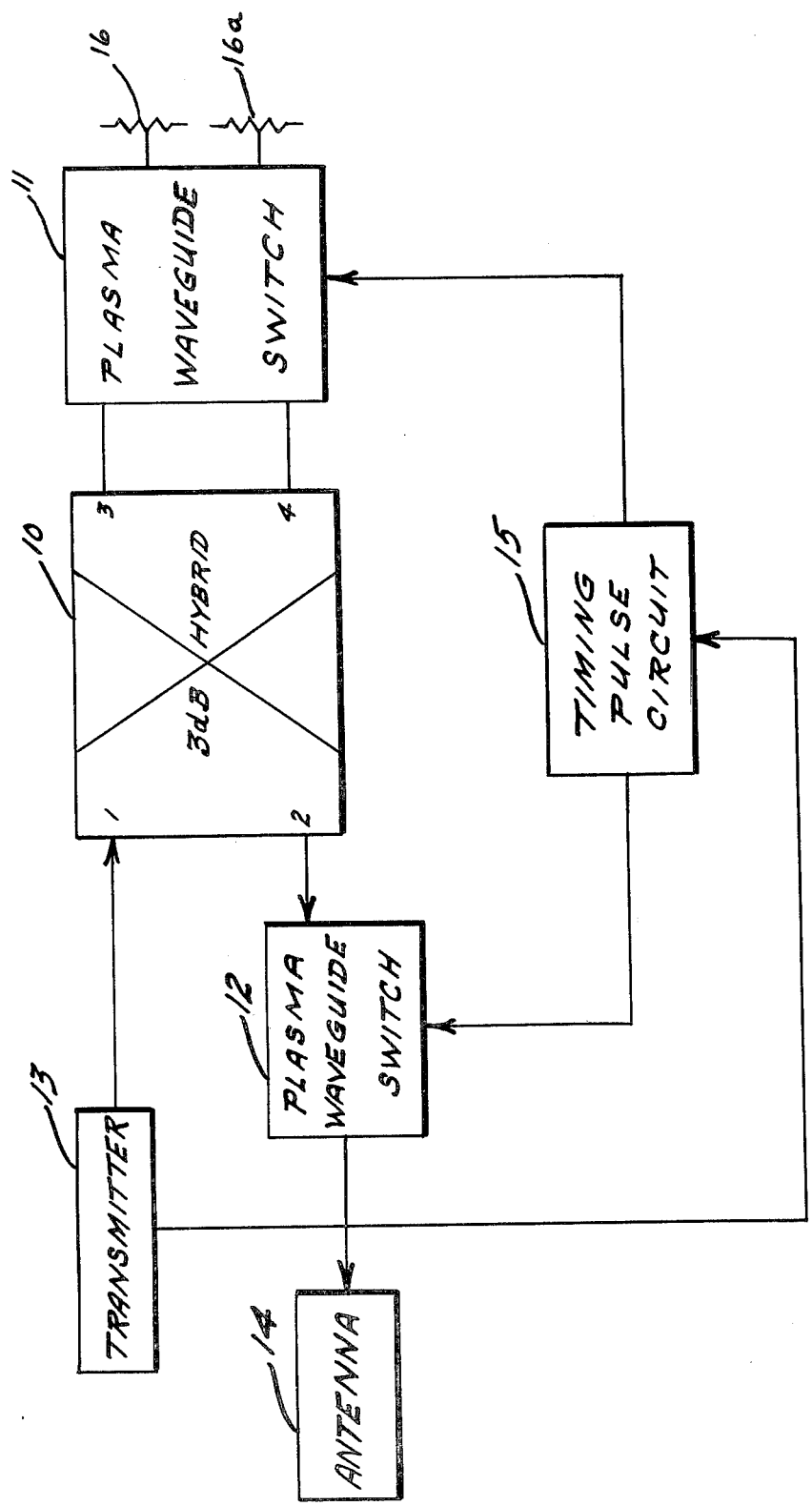

HIGH POWER MICROWAVE RADAR PULSE SHAPING SYSTEM

STATEMENT OF GOVERNMENT INTEREST

The invention described herein may be manufactured and used by or for the Government for governmental purposes without the payment of any royalty thereon.

BACKGROUND OF THE INVENTION

The plasma waveguide switch (PWS) is a pulsed high power microwave switching device consisting of a cathode, anode, and waveguide grid all hermetically sealed and filled with an appropriate gas. The waveguide broadwalls are perforated to allow passage of a plasma discharge between cathode and anode. The waveguide grid is usually operated at ground potential with cathode pulsed at negative potential to initiate the discharge between cathode and grid. A secondary grid can be used at an intermediate negative pulsed voltage between the cathode and grounded waveguide grid to initiate the discharge. A pulse forming network connected to the anode then discharges through the device creating a dense plasma in the waveguide. If the density is high enough, this plasma is opaque to electromagnetic waves at microwave frequencies and forms an effective pulsed microwave waveguide switch. The higher the frequency the higher is the plasma density required.

At millimeter frequencies a plasma focusing cone is used between the cathode and the waveguide grid to increase plasma density. The focusing cone is then operated at an intermediate negative pulsed voltage between the cathode and grounded waveguide grid. This pulsed voltage then initiates the plasma discharge.

One of the most important uses of the PWS is in pulse shaping. By proper pulse timing the PWS can be made to fire at any instant during passage of the RF pulse through the PWS. Since the formation of the plasma is in the order of a nanosecond, the reflected chopped RF pulse will have a rise time of approximately 1 to 2 nanoseconds while the transmitted RF pulse will have a fall time of approximately 1 to 2 nanoseconds. By using 2 PWS's in a microwave system, in which PWS No. 1 chops the front of the pulse and PWS No. 2 chops the back of the pulse, an RF pulse can be chopped twice to form a pulse of any width (as short as a few nanoseconds if desired) and with rise and fall time of the order of 1 to 2 nanoseconds.

SUMMARY OF THE INVENTION

A high power microwave radar pulse shaping system is provided which uses a 3 db hybrid plasma waveguide switch arrangement. Two plasma waveguide switches are utilized. The first plasma waveguide switch to fire covers both waveguide sections of the hybrid. A RF transmitter pulse from arm one is split equally by the 3 db hybrid into arms three and four and both pulses are chopped by pulse waveguide switch one. Reflected pulses combine at arm two and this pulse is chopped by plasma waveguide switch two. The output pulse at the antenna has its sharp leading edge formed by plasma waveguide switch one and its sharp falling edge formed by plasma waveguide switch two. The RF pulsewidth can be varied electrically, if desired, by varying the delays on the grid pulses.

DESCRIPTION OF THE DRAWING

The single FIGURE of the preferred embodiment shows a high power microwave waveguide system used for radar RF pulse shaping.

DETAILED DESCRIPTION OF THE PREFERRED EMBODIMENT

Now referring to the single FIGURE in detail, there is shown conventional 3 dB microwave hybrid 10 having arms 1, 2, 3 and 4. There are utilized conventional plasma waveguide switches 11 and 12 in combination with 3 dB hybrid 10, each of the plasma waveguide switches having an associated grid for pulsing thereof. Plasma waveguide switches are provided with terminations 16 and 16a. Plasma waveguide switch 11 is the first one to fire and it covers both waveguide sections of the hybrid. The RF pulse high-power transmitter 13 received by arm 1 is split equally by 3 dB hybrid 10 into arms 3 and 4 and both pulses are chopped by plasma waveguide switch 11. Reflected pulses combine at arm 2 and this pulse is chopped by plasma waveguide switch 12. The output pulse from plasma waveguide switch 12 received by antenna 14 has its sharp leading edge formed by plasma waveguide switch 11 and its sharp falling edge formed by plasma waveguide switch 12. One way the RF pulsewidth can be varied electronically, if desired, is by varying delays on the grid pulses.

To obtain the desired leading and trailing edge of the output pulse, the appropriate timing of the pulse waveguide switches may be realized by the predetermined grid pulsing of the first and second pulse waveguide switches. The timing pulses are applied to pulse waveguide switches 10 and 11 from timing pulse circuit 15. Timing pulse circuit 15 may be of a conventional type such as a multivibrator. Timing pulse circuit 15 may receive a synchronizing signal from transmitter 13.

It is also noted that the timing pulses applied in a predetermined sequence will also control the width of the output pulse.

The two pulse waveguide switches utilized in combination with the 3 dB hybrid may, if desired, use a common cathode. Suitable baffling of the grid circuits is necessary if a common housing is used for both pulse waveguide sections.

What is claimed is:

1. A high power microwave radar pulse shaping system comprising a 3 dB microwave hybrid having first, second, third and fourth arms, a transmitting antenna, first and second plasma waveguide switches, each having an associated grid for the pulsing thereof for predetermined firing purposes, said first plasma waveguide switch connected to both of said third and fourth arms, said second plasma waveguide switch interconnecting said second arm and said transmitting antenna, means to pulse said first and second plasma waveguide switches at predetermined times, a microwave high power RF pulse transmitter delivering to said first arm a RF pulse, said RF pulse then being split equally by said 3 dB microwave hybrid into said third and fourth arms with the split pulses being chopped by said first plasma waveguide switch, resulting reflected pulses then being combined at said second arm with the combined pulse being chopped by said second plasma waveguide switch, the output pulse at the antenna having its sharp leading edge formed by the predetermined pulsing of said first plasma waveguide switch and its sharp falling edge formed by the predetermined pulsing of said second plasma waveguide switch.

2. A high power microwave radar pulse shaping system as defined in claim 1 further including terminations for said first plasma waveguide switch.

* * * * *